July 10, 1956 G. D. FORBES 2,754,503

DIGITAL READING APPARATUS

Filed Dec. 21, 1951 4 Sheets-Sheet 1

INVENTOR.
G. DONALD FORBES
BY
Campbell, Brumbaugh, Free & Graves
HIS ATTORNEYS.

INVENTOR.
G. DONALD FORBES
BY
HIS ATTORNEYS.

July 10, 1956 G. D. FORBES 2,754,503

DIGITAL READING APPARATUS

Filed Dec. 21, 1951 4 Sheets-Sheet 3

INVENTOR.
G. DONALD FORBES
BY Campbell, Brumbaugh, Free & Graves
HIS ATTORNEYS.

INVENTOR.
G. DONALD FORBES
BY
Campbell, Brumbaugh, Free + Graves
HIS ATTORNEYS.

2,754,503
Patented July 10, 1956

2,754,503

DIGITAL READING APPARATUS

G. Donald Forbes, Sudbury, Mass., assignor to Arthur D. Little, Inc., Cambridge, Mass., a corporation of Massachusetts Application December 21, 1951, Serial No. 262,822

13 Claims. (Cl. 340—347)

Figure 1:
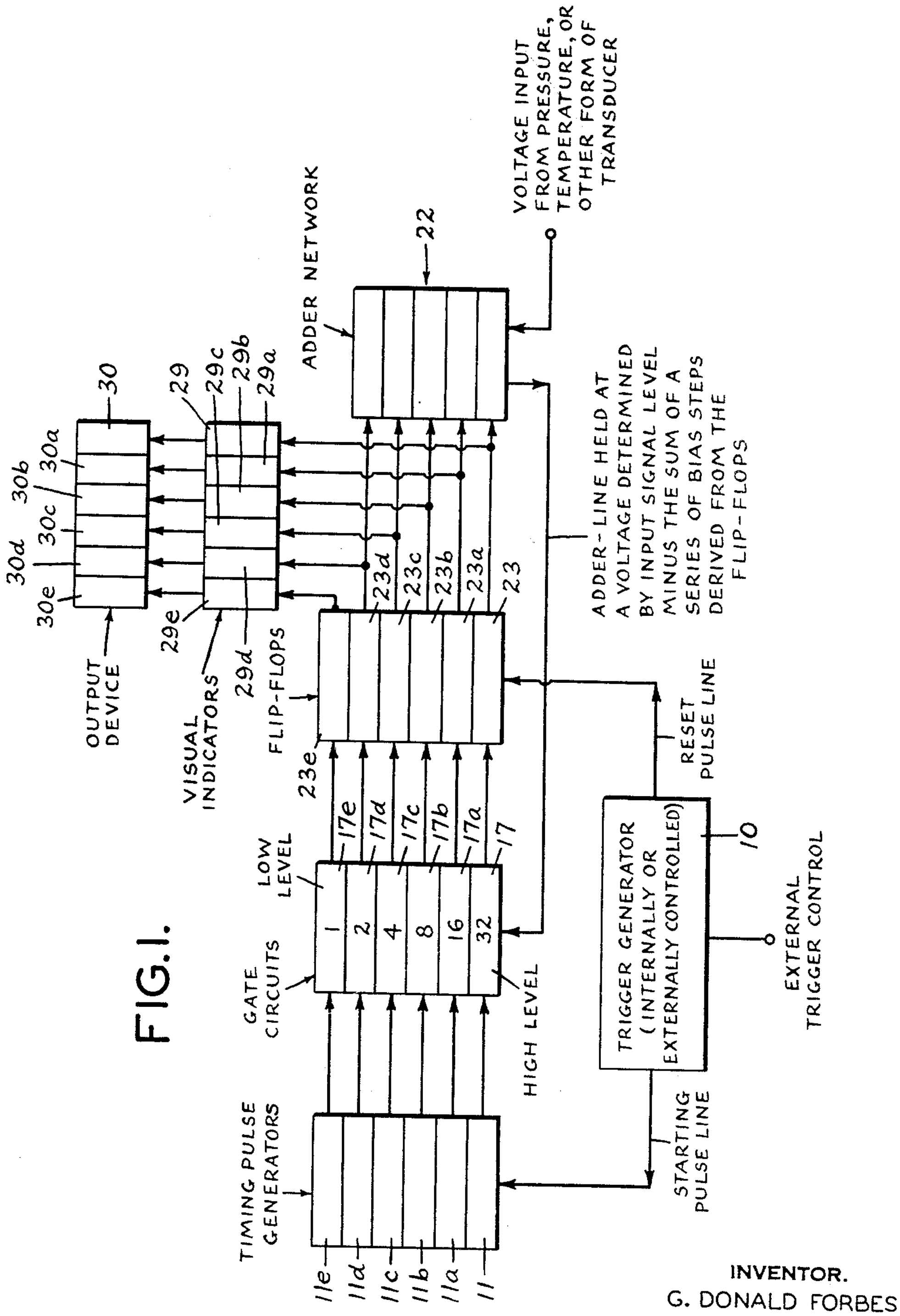

The present invention relates to apparatus for converting instantaneous values of a continuously variable quantity into digital form for automatic recording, computation, or transmission, for example. More specifically, it has to do with new and improved apparatus of this character which is capable of converting a voltage level into binary form accurately at high speeds of operation.

Several different types of digital reader apparatus have been employed heretofore for converting a continuously variable quantity such as a voltage, for example, to a group of pulses in binary form. In one form, the conversion is effected by counting pulses, one pulse being counted for each unit of potential. Apparatus of this type usually requires a multiplicity of electron tubes and is quite complex in construction. Binary digital reader apparatus has also been devised which is capable of accomplishing the same results with fewer tubes at higher operating speeds. While such apparatus is effective, it is sometimes susceptible of errors in operation at marginal input levels.

It is an object of the invention, accordingly, to provide new and improved digital reader apparatus which is free from the above-noted deficiencies of the prior art.

Another object of the invention is to provide new and improved binary digital apparatus of the above character which is characterized by higher speeds of operation than have been attainable heretofore yet is positive in operation at marginal input levels so that the likelihood of error is substantially eliminated.

These and other objects of the invention are attained by providing separate channels for the binary digits, each of which is responsive to the input only for a small fraction of the operating cycle. Further, the intervals during which the respective channels are capable of responding to the input are spaced apart in time permitting no overlap in operation.

In a typical embodiment, each channel representing a binary digit includes a gating circuit which is adapted to trigger a flip-flop circuit only during the coincidence of a trigger pulse and a sufficient D. C. level from an adder device. The trigger pulses for operation of the gating circuits are supplied from a chain of blocking oscillators, the first one of which receives a starting pulse from a trigger generator, each succeeding one being actuated by a pulse supplied from the preceding oscillator. Each gating circuit is set to respond only when the D. C. input voltage level thereto at the time a trigger pulse is received exceeds a value which represents in magnitude the corresponding binary digit.

The adder device receives an input voltage representing the magnitude of the input signal and is also adapted to receive an input from any flip-flop circuit that may be energized during an operating cycle. In response to these combined inputs, the adder circuit supplies an input level to the gating circuits which equals the input signal minus one or more voltages whose magnitudes represent binary digits corresponding to any channels in which the flip-flop circuits have been triggered.

Each flip-flop circuit when triggered energizes an output device and may also operate a visual signal. At the conclusion of a reading cycle, any triggered flip-flop circuits are restored to their initial conditions of operation by a reset pulse which may be initiated by the trigger generator, following which a new cycle begins upon receipt of a new starting pulse from the trigger generator.

Figure 2A:
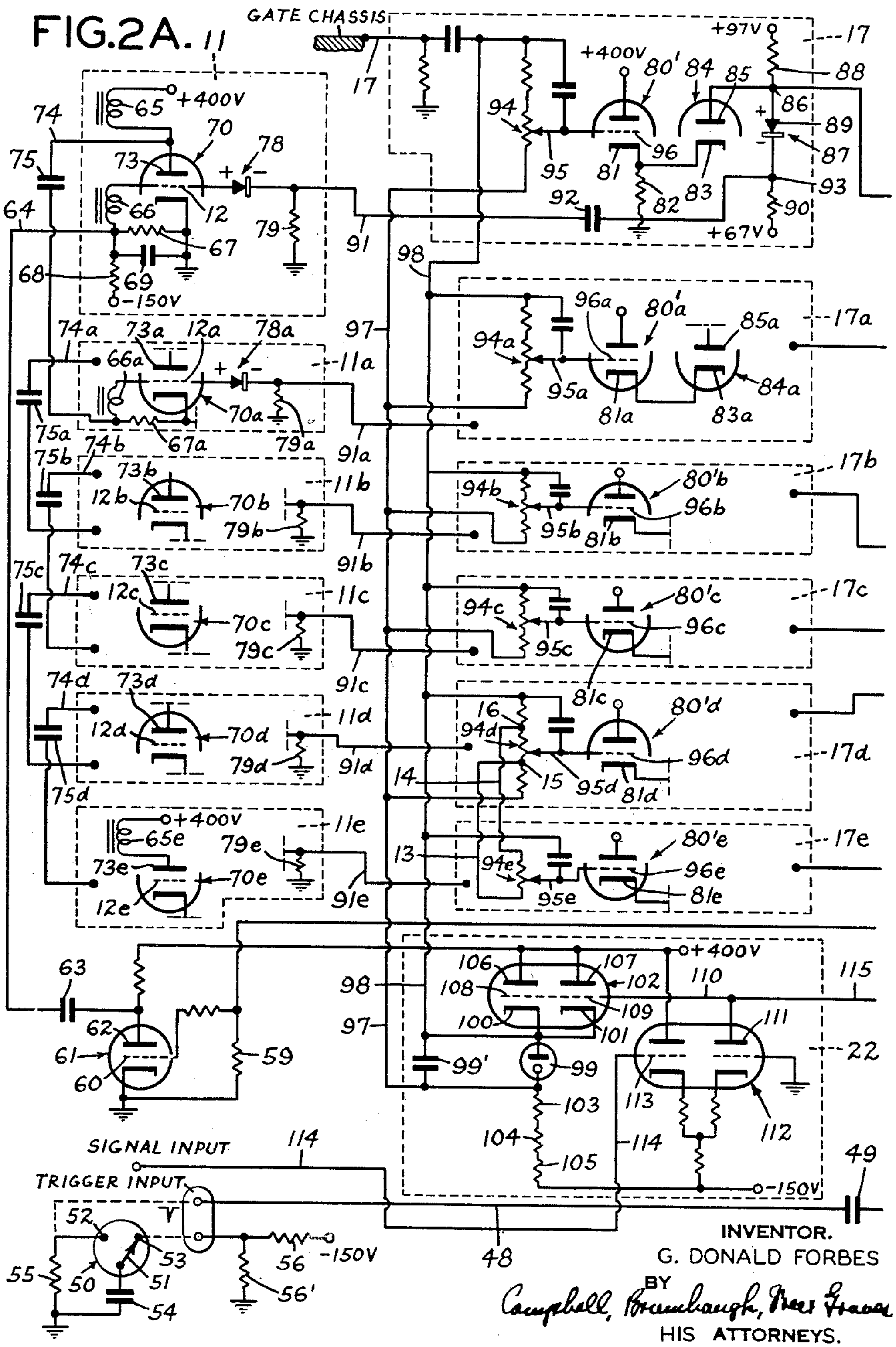
Figure 2B:
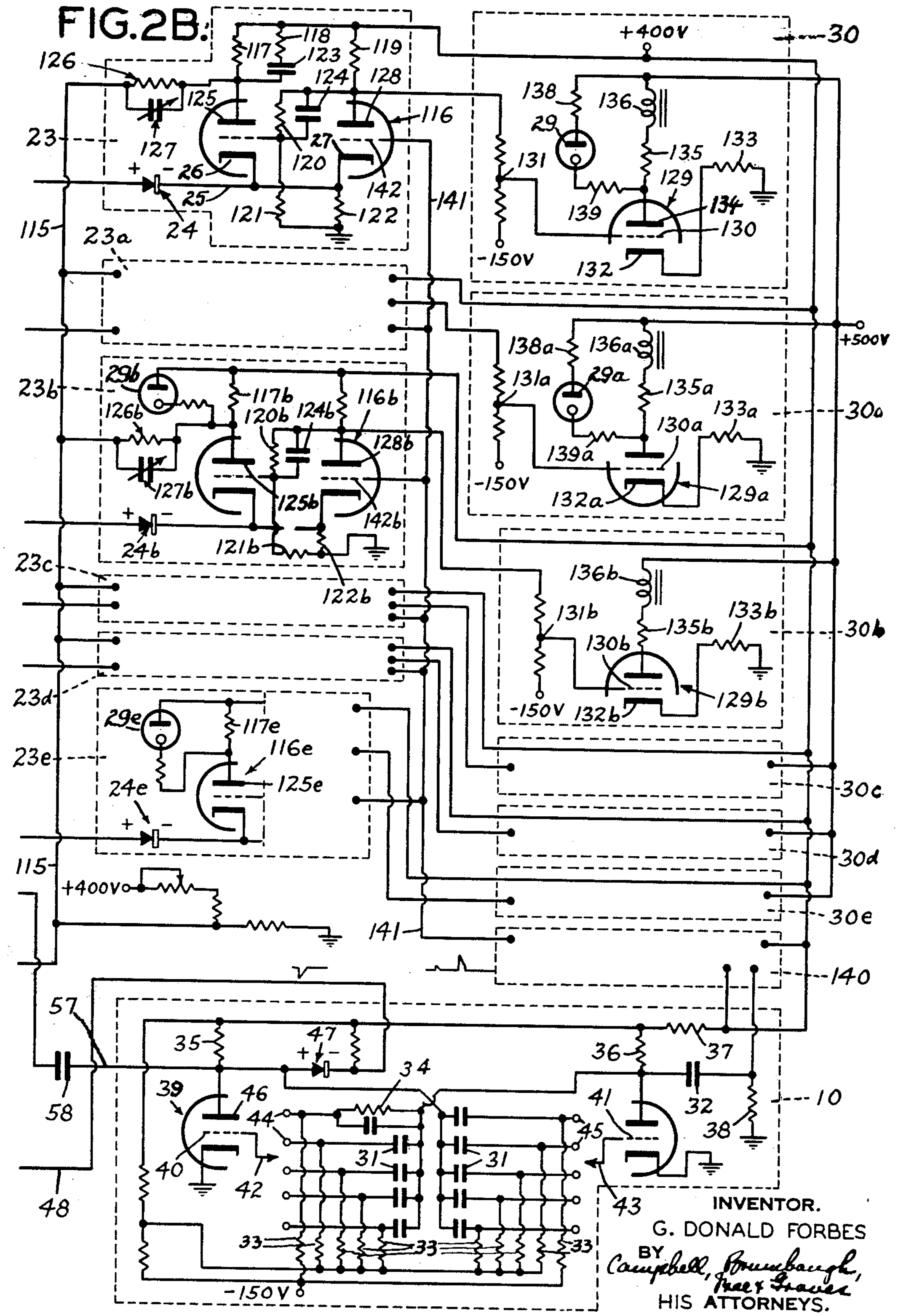
Figure 3:
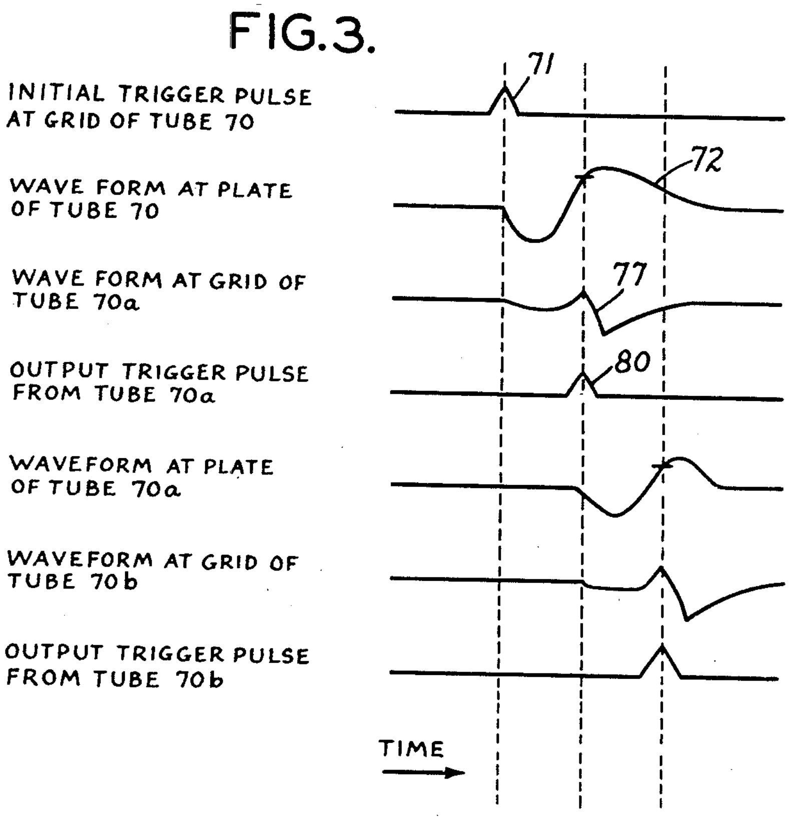
Figure 4:
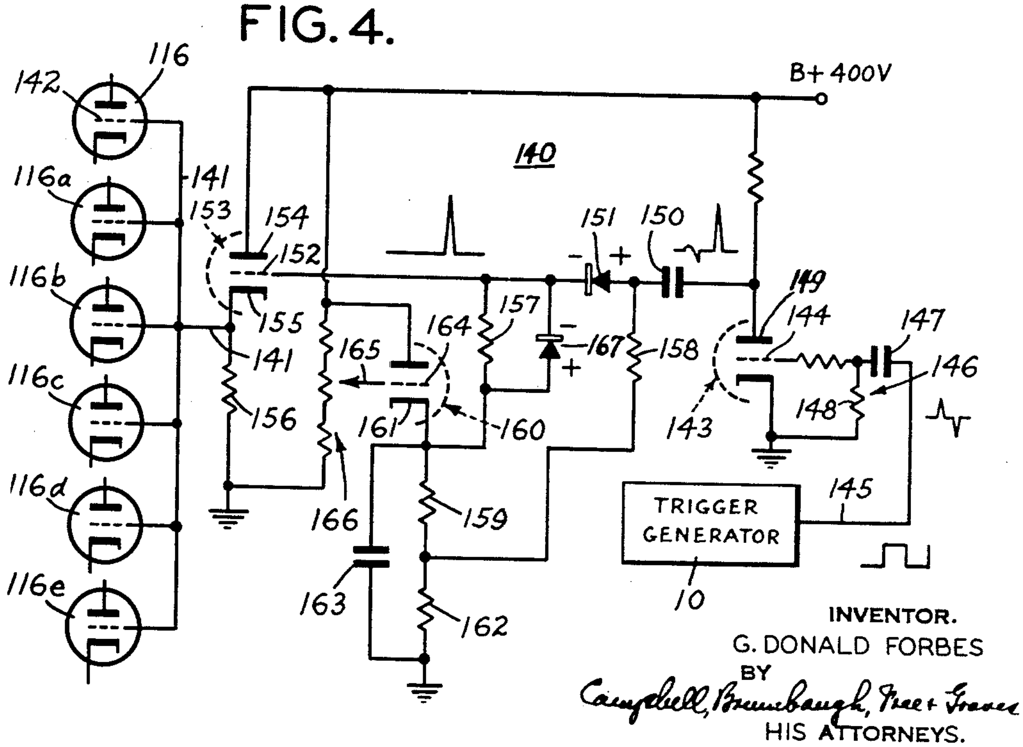

The invention may be better understood from the following detailed description of a representative embodiment thereof taken in conjunction with the accompanying drawings in which:

Fig. 1 is a flow diagram illustrating typical binary digital reader apparatus constructed according to the invention;

Figs. 2A and 2B when placed side by side illustrate schematically the control circuits employed in the apparatus of Fig. 1;

Fig. 3 shows a group of curves illustrating the wave forms at several points in the blocking oscillators in the circuits shown in Fig. 2A; and Fig. 4 is a schematic diagram of a typical reset circuit according to the invention.

For purposes of illustration, a typical six digit reader apparatus will be described herein. However, it will be understood that reader apparatus employing more or less than six binary digits may be provided according to the invention, as required.

Referring now to the flow diagram appearing in Fig. 1, the apparatus comprises a trigger generator 10 which may be controlled internally or externally to generate a starting pulse at any frequency up to say 50 kc. The generator 10 is also preferably designed to provide a reset pulse at a given time, say 10 microseconds after initiation of the starting pulse, or after a long interval when relays or the like must be energized from the output of the apparatus. The starting pulse from the generator 10 is fed to the first timing pulse generator 11 of a group of timing pulse generators **11–11*e*, inclusive, which correspond to the binary digits 32, 16, 8, 4, 2 and 1, respectively. The pulse from the trigger generator 10 actuates the first timing pulse generator 11 which in turn actuates the timing pulse generator 11*a*** and so on, each timing pulse generator being adapted to be actuated by the preceding one.

Each of the timing pulse generators **11–11*e*, inclusive, provides a short pulse of say 0.2 microsecond duration which is fed to the respective gating circuits 17–17*e*, inclusive. These pulses may be spaced apart say 0.5 microsecond in time. Each of the gating circuits 17–17*e*, inclusive, receives a D. C. level from an adder network 22, in addition to a timing pulse from one of the timing pulse generators 11–11*e***, inclusive.

The function of each of the gating circuits **17–17*e*, inclusive, is to provide a signal to trigger one of a plurality of flip-flop circuits 23–23*e*, inclusive, only during the coincidence of a timing pulse from the corresponding timing pulse generator and a D. C. level from the adder network 22 equal to or greater than a certain setting. By way of example, the gating circuits 17–17*e*, inclusive, in a six digit reader apparatus, as shown, may be set for 32, 16, 8, 4, 2 and 1 units of voltage supplied from the adder network 22**.

The flip-flop circuits **23–23*e*, inclusive, are preferably designed to give a relatively large voltage change when triggered. The flip-flop circuits 23–23*e*, inclusive, supply signal outputs to a plurality of visual indicators 29–29*e* and also to suitable output devices 30–30*e*, such as relays, for example. In addition, the flip-flop circuits 23–23*d*, inclusive, when triggered are adapted to provide inputs to the adder network 22, the input from any flip-flop circuit producing a change in the output of the adder network which is half as great as that produced by the preceding flip-flop circuit. With this construction, the signal output from the adder network 22 is equal to the input signal thereto minus the inputs supplied thereto when one or more of the flip-flop circuits 23–23*e***, inclusive, have been triggered.

At the conclusion of each reading cycle, a reset pulse is applied from the trigger generator 10 to each of the flip-flop circuits **23–23*e***, inclusive, to restore those that have been triggered to their normal conditions of operation.

Considering now Fig. 2B, the trigger generator 10 may comprise, for example, a multi-vibrator circuit including a plurality of condensers 31 and 32 and resistors 33, 34, 35, 36, 37 and 38 connected to a conventional double triode 39, as shown. The grids 40 and 41 in the double triode 39 are connected to movable contact arms 42 and 43 which are adapted to engage selectively a plurality of fixed contacts 44 and 45, respectively, as required to connect the trigger generator 10 for internal or external control at any one of a plurality of different frequencies up to say 50 kc. per second.

For external excitation of the trigger generator 10, the plate 46 of the double triode 39 may be connected to a suitable trigger pulse source through a unilaterally conducting device 47 such as a germanium crystal, for example, a conductor 48 and a condenser 49. In Fig. 2A the trigger source provides a negative pulse and it may comprise, for example, a motor driven switch 50 having a movable contact 51 adapted to engage selectively either of two fixed contacts 52 and 53. A condenser 54 is connected between the movable contact 51 of the switch 50 and ground, and a resistor 55 is connected between the fixed contact 52 and ground. The fixed contact 53 of the switch 50 is connected in series with a resistor 56 to a suitable source of negative voltage (not shown), a resistor 56' being connected between the switch contact 53 and ground.

With the construction described above, the condenser 54 is charged negatively when the switch 50 is in the position shown. Movement of the contact arm 51 into engagement with the fixed contact 52 discharges the condenser 54 through the resistor 55, providing a sharp negative trigger pulse which is fed through the conductor 48 and condenser 49 to the plate 46 of the double triode 39 in the trigger generator 10 (Fig. 2B).

The pulse output from the trigger generator 10 passes over a conductor 57 to a differentiating circuit comprising a series condenser 58 and a shunt resistor 59 (Fig. 2A) which impresses a sharp pulse upon the grid 60 of a conventional triode 61. The pulse output from the tube 61 is fed from the plate 62 thereof through a condenser 63 and conductor 64 to the timing pulse generator 11. The timing pulse generator 11 may comprise, for example, a blocking oscillator including the coupled windings 65 and 66, the resistors 67 and 68 and the condenser 69 connected, as shown, to the elements of a conventional triode 70.

The pulse supplied from the conductor 64 is fed to the timing pulse generator 11 in the chain of timing pulse generators at the junction point between the winding 66 and the resistor 67. The timing pulse generators **11–11*e*, inclusive, are substantially identical and common elements in each will be designated by like reference characters with appropriate subscripts. The pulse appearing at the grid 12 of the tube 70 has the shape shown generally by the curve 71 in Fig. 3 and it passes through a unilaterally conducting device 78 and develops a positive pulse across the resistor 79. The pulse at the grid 12 of the tube 70 shocks the timing pulse generator 11 into oscillation producing a wave form at the plate 73 of the tube 70 which has the general appearance shown by the curve 72** in Fig. 3.

The voltage at the plate 73 of the tube 70 is fed through a conductor 74 and condenser 75 to the common point between the winding **66*a* and the resistor 67*a* in the timing pulse generator 11*a*. The latter is so designed that the wave form appearing at the grid 12*a* of the tube 70*a* has the shape shown generally by the curve 77 in Fig. 3. The positive portion of the wave 77 is fed through the germanium crystal 78*a* and develops in the load resistor 79*a* a sharp positive voltage pulse having a wave form like that shown by the curve 80** in Fig. 3.

In similar fashion, each of the timing pulse generators **11*b*–11*e*, inclusive, is pulsed by the preceding pulse generator. Preferably, the pulse generators 11–11*e*, inclusive are so designed that each generates a pulse of given duration, say 0.2 microsecond, while the pulses from the successive generators are spaced apart by a given time interval, say 0.5 microsecond. In this fashion, pulses approximately 0.2 microsecond wide and one-half microsecond apart are developed successively across the resistors 79, 79*a*, 79*b*, 79*c*, 79*d* and 79*e***, respectively.

As stated, the timing pulses from the timing pulse generators **11–11*e*, inclusive, are fed to a plurality of gating circuits 17–17*e*, inclusive, each of which is adapted to generate a triggering signal only during coincidence of a timing pulse and a predetermined D. C. input level thereto. The gating circuits 17–17*e*** are substantially identical in construction and it will be necessary, therefore, to describe only one in detail, corresponding parts in the others being designated by corresponding reference characters with appropriate subscripts.

The gating circuit 17, for example, comprises a conventional triode 80', the cathode 81 of which is connected in series with a cathode resistor 82 to ground, as shown. The cathode 81 is also connected to the cathode 83 of a conventional diode rectifier tube 84, the anode 85 of which is connected to a point 86 on a voltage divider 87 comprising a fixed resistance 88, a unilaterally conducting device 89 such as a germanium crystal, for example, and a fixed resistor 90. The upper end of the resistor 88 may be maintained at a positive potential of say 97 volts by a suitable voltage source (not shown) and the lower end of the resistance 90 may be maintained at a positive potential of say 67 volts by the same source. The positive timing pulse is fed from the timing pulse generator 11 through a conductor 91 and condenser 92 to a point 93 between the crystal 89 and the resistor 90.

As indicated, the gating circuits **17–17*e*, inclusive, are adapted to produce triggering pulses only when the D. C. input levels thereto are equal to or greater than certain settings at those times when pulses are being received from the appropriate timing pulse circuits 11–11*e*, inclusive. For a six binary digit reader as shown in Figs. 2A and 2B, the input voltage level settings for the gating circuits 17–17*e*, inclusive, might be 32, 16, 8, 4, 2 and 1 volts, respectively. These voltage settings may be provided by a plurality of voltage dividers 94–94*e*, inclusive, having adjustable contacts 95–95*e*, respectively, connected to the control grids 96–96*e*, respectively, of the tubes 80'–80'*e*, respectively, in the gating circuits 17–17*e*, inclusive. The voltage divider 94*e* is connected by the conductors 13 and 14 to taps 15 and 16 on the voltage divider 94*d***.

The voltage dividers **94–94*d*, inclusive, are connected by the conductors 97 and 98 to the terminals of a conventional voltage regulator tube 99 shunted by a condenser 99' and disposed in a cathode circuit connected to the cathodes 100 and 101 of a double triode 102 in the adder network 22. The voltage regulator tube 99 maintains a fixed potential difference between the conductors 97 and 98 while the conductor 98 follows variations in the potential of the cathodes 100 and 101 of the tube 102. The voltage regulator tube 99 is connected in series with the cathode resistors 103, 104 and 105 to a terminal maintained at a negative potential of say 150 volts by a suitable voltage source (not shown). The plates 106 and 107** of the double triode are both connected to a terminal maintained at a positive potential of say 400 volts.

The grids 108 and 109 of the double triode 102 are connected together and by a conductor 110 to the plate 111 of a conventional double triode 112 which is connected as a conventional cathode coupled amplifier, the grid 113 of which receives the signal input over a conductor 114. The signal input may be a continuously variable analogue such as a voltage from a pressure, temperature or other form of transducer. The grid 109 of the double triode 102 is also adapted to receive a plurality of voltages over the conductor 115 from the flip-flop circuits **23–23*e***, inclusive, as will be described in greater detail hereinafter.

The gating circuits **17–17*e*, inclusive, are preferably adjusted so that in the absence of gating pulses from the corresponding timing pulse circuits there will be no output pulse regardless of the magnitudes of the input signals from the voltage dividers 94–94*e*, inclusive. Also, no output pulse is developed when pulses are received from the corresponding timing pulse generators if the signal inputs from the voltage dividers 94–94*e*, inclusive, are less than the established D. C. input level settings therefor. When, however, the input from any one of the voltage dividers 94–94*e***, inclusive, equals or exceeds the D. C. input level setting for the particular gating circuit, and a pulse is received from the corresponding timing pulse generator, then, and only then, will the particular gating circuit produce an output pulse.

For example, in the case of the gating circuit 17, assume that the voltage input to the grid 96 of the tube 80′ from the voltage divider 94 is equal to or greater than 32 units of voltage which is the input level setting for this gating circuit. Under these conditions, the voltage at the cathode 81 of the tube 80′ is high enough to cause the diode 84 to cease conducting. If now a pulse is received from the timing pulse generator 11, it cuts off the normally conducting germanium crystal 89, so that the potential at the point 86 rises positively a sufficient amount to cause the diode 84 to become conducting again. This produces a triggering pulse which is transmitted to the corresponding flip-flop circuit 23 through a unilaterally conducting device 24 such as a germanium crystal (Fig. 2B).

The flip-flop circuits **23–23*e*, inclusive, are substantially identical in construction and only one need be described in detail. Corresponding parts in the others will be designated by like reference characters with appropriate subscripts. The flip-flop circuit 23 may be of the conventional type comprising a double triode 116, a plurality of resistors 117, 118, 119, 120, 121 and 122 and a plurality of condensers 123 and 124 connected as shown in Fig. 2B. The triggering pulse from the gating circuit 17 is fed through the crystal 24 and the conductor 25 to the cathodes 26 and 27 of the tube 116**.

Normally, the flip-flop circuit 23 is adjusted so that the right-hand portion of the double triode 116 is conducting so that the potential at the plate 125 in the left-hand portion of the double triode 116 is substantially the plate voltage supplied (i. e., 400 volts). This potential in the flip-flop circuits 23–23d, inclusive, is supplied to the grid 109 of the double triode 102 (Fig. 2A) in the adder network 22 through the conductor 115 and a voltage dropping circuit which, in the flip-flop circuit 23, comprises a resistance 126 and a condenser 127 in parallel.

The flip-flop circuits **23–23*d*, inclusive, may be designed so that triggering thereof produces the same voltage change at the plates of the tubes therein corresponding to the tube 116 in the flip-flop circuit 23. The voltage dropping networks, however, are designed so that triggering the flip-flop circuit 23 produces a maximum voltage change at the grid 109 of the tube 102 in the adder circuit 22 (Fig. 2A), whereas the voltage change produced in the adder circuit 22 by triggering any one of the succeeding flip-flop circuits 23*a*–23*d***, inclusive, is only one-half as great as that which triggering the preceding flip-flop circuit would produce.

It will be understood, therefore, that the actual voltage appearing at the conductor 98 which is connected to the cathodes 100 and 101 of the double triode 102 will be the input signal voltage minus the level produced from the triggering of one or more of the flip-flop circuits **23–23*d***, inclusive.

Since the flip-flop circuit 23*e* is the last one in the group and the reading cycle ends when it is actuated, it does not provide any input to the conductor 115 which is connected to the adder network 22.

When the flip-flop circuits **23–23*e*, inclusive, are triggered by outputs from the corresponding gating circuits 17–17*e*, inclusive, the potentials at the plates of the tubes therein corresponding to the double triode 116 rise from relatively low values to relatively high values. These potentials may be utilized, according to the invention, to operate a plurality of substantially like output devices 30–30*e***, inclusive.

The output device 30 may comprise, for example, a conventional triode 129, the grid 130 of which is connected to a point on a voltage divider 131, the upper end of which is connected to the plate 128 of the double triode 116 and the lower end of which is maintained at a negative potential of say 150 volts by a suitable voltage source (not shown). The cathode 132 is connected in series with a cathode resistor 133 to ground. The plate 134 is connected in series with a resistor 135 and the winding 136 of a relay, for example, to a source of voltage (not shown) at a potential of say 500 volts, for example.

A visual indication of the actuation of the output device 30 may be provided by connecting a visual indicator such as a neon lamp 29 and a pair of resistors 138 and 139 in series in parallel with the relay winding 136 and the resistor 135. A similar neon lamp **29*a* connected in parallel with the winding of the relay 136*a*, may be provided in the output device 30*a*. However, it is desirable to connect the visual indicators 29*c*, 29*d* and 29*e* (Fig. 1) in the same manner as the indicator 29*b*, which is connected in parallel with the resistor 117*b* in the flip-flop circuit 23*b***, as shown.

A predetermined time after initiation of each starting pulse, a reset circuit 140 produces a reset pulse for restoring to the normal operating condition any of the flip-flop circuits **23–23*e*, inclusive, that may have been triggered. The reset circuit 140 (Fig. 4) includes an electron tube 143, the grid 144 of which receives an input from the trigger generator 10 through a conductor 145 and a differentiating circuit 146 comprising a series condenser 147 and a shunt resistor 148. Positive pulses in the output of the tube 143 are fed from the plate 149 thereof through a D. C. blocking condenser 150 and a unilaterally conducting device 151 such as a germanium crystal, for example, to the control grid 152 of an electron tube 153, the plate 154 of which is connected to the B+ terminal of the plate supply (not shown) and the cathode 155 of which is connected through a cathode resistor 156 to ground. The reset pulse developed across the cathode resistor 156 is fed through the conductor 141 to the grid 142 in the double triode 116 and to the grids of the corresponding double triodes 116*a*–116*e* in each of the flip-flop circuits 23–23*e***, inclusive.

Preferably, biasing voltage is applied to the unilaterally conducting device 151 for the purpose of insuring that negative pulses or small positive pulses will not pass to the grid 152 of the tube 153. To this end, the two terminals of the unilaterally conducting device 151 are connected in series with the resistors 157 and 158, respectively, to the terminals of a resistor 159 in the cathode circuit of an electron tube 160. The cathode 161 of the tube 160 is connected in series with the resistors 159 and 162 to ground and the latter two resistors are by-passed by a condenser 163. The grid 164 of the tube 160 is connected to an adjustable contact 165 on a voltage divider 166, the terminals of which are connected to ground and to the B+ terminal of the plate supply (not shown), respectively. With this construction, it will be understood that the unilaterally conducting device 151 is biased by the D. C. potential drop across the resistor 159.

In order to insure that the D. C. level between pulses will never become more negative than the cathode 161, the latter is connected by a unilaterally conducting device such as a germanium crystal 167, for example, to the grid 152 of the tube 153.

It has been found that the reset circuit 140 recovers rapidly and provides a steady D. C. level between pulses over a very wide range of reset pulse duty cycle. Further, the possibility of reset occurring due to pickup of the starting trigger or any other signal is greatly reduced by the crystal 151.

In operation, assume that the D. C. input signal at the conductor 114 (Fig. 2A) has an amplitude corresponding to 21 units. The trigger generator 10 initiates a starting pulse which produces timing pulses approximately 0.2 microsecond in width and one-half a microsecond apart by means of the timing pulse generators 11–11*e*, inclusive. The pulse supplied to the gating circuit 17 from the timing pulse generator 11 does not result in the operation of that gating circuit because it is set for an input level of 32 units, whereas the signal input is only 21 units. Accordingly, the flip-flop circuit 23 (Fig. 2B) is not actuated and the output device 30 is not energized.

One-half microsecond later, the timing pulse generator 11*a* supplies a pulse to the gating circuit 17*a* (Fig. 2A). Since the input of 21 units to this circuit is greater than the voltage for which it is set (16 units) it produces a triggering pulse which triggers the flip-flop circuit 23*a* (Fig. 2B) and energizes the output circuit 30*a* and the lamp 29*a*.

Triggering of the flip-flop circuit 23*a* causes the voltage at the plate of the double triode therein corresponding to the double triode 116 in the flip-flop circuit 23 to drop from a relatively high positive value to a relatively low positive value. This change in voltage, which is fed through the voltage dropping circuit in the flip-flop circuit 23*a* which corresponds to the voltage dropping circuit 126 in the flip-flop circuit 23, to the grid 109 of the double triode 102 in the adder circuit 22, produces a 16 unit drop in the voltage appearing at the cathodes 100 and 101 of the tube 102, leaving a voltage of 5 units.

Since the gating circuit 17*b* is set for an input level of 8 units, whereas the input thereto is only 5 units, it is not actuated when a pulse is subsequently received from its timing pulse generator 11*b*.

When the timing pulse generator 11*c*, one-half microsecond later, supplies a pulse to the gating circuit 17*c*, this circuit produces a triggering pulse because the input voltage of 5 units thereto is greater than the voltage setting therefor (4 units). The triggering voltage triggers the flip-flop circuit 23*c* resulting in energization of the output device 30*c* and the lamp 29*c*.

The triggering of the flip-flop circuit 23*c* causes the voltage at the plate of the tube therein corresponding to the double triode 116 in the flip-flop circuit 23 to drop from a relatively high positive value to a relatively low positive value. This voltage change is fed through the voltage dropping circuit in the flip-flop circuit 23*c* which corresponds to the voltage dropping circuit 126 in the flip-flop circuit 23 and through the conductor 115 to the adder circuit 22, reducing the voltage at the cathodes 100 and 101 of the tube 102 by 4 units and leaving an input voltage of one unit.

Since the gating circuit 17*d* is set for an input level of 2 units of voltage, the one unit input thereto is insufficient to operate it when it receives a timing pulse from the timing pulse generator 11*d* so that the output device 30 is not operated.

However, the gating circuit 17*e*, which is set for an input of one unit, is operated by the input voltage of one unit from the adder network 22 upon receipt of a pulse from the timing pulse generator 11*e*, so that it triggers the flip-flop circuit 23*e* which energizes the output circuit 30*e* and the lamp 29*e* (Fig. 1). As noted above, the flip-flop circuit 23*e* does not supply an input to the adder network 22, since the reading cycle is now ended. In a typical digital reader apparatus constructed as shown in Fig. 2, the elapsed time from the initiation of the starting pulse to the energization of the output device 30*e* may be about 4 microseconds.

After a short time, determined by the characteristics of the output device employed, the reset network 140 (Fig. 4) supplies a reset pulse to the grid 142 of the tube 116 in the flip-flop circuit 23, and to the grids of the corresponding tubes in the flip-flop circuits 23*a*–23*e*, inclusive, thus resetting any of the flip-flop circuits 23–23*e* which may have been triggered. Some time later, again determined by the type of output device used, the trigger generator 10 will initiate the reset operating cycle by means of a new starting pulse.

While the output devices 30–30*e*, inclusive, have been shown as energizing relays, it will be understood that the outputs may be utilized in many different ways. For example, the output devices 30–30*e*, inclusive, may be used to energize a conventional IBM card key punch, a magnetic drum or tape recorder, a high speed digital computer, or a modulator for radio transmission of data, to name only a few possibilities.

The invention thus provides novel and highly effective digital reader apparatus which is adapted to accomplish high speed conversion of a voltage to a group of pulses in binary form. By making the channel for each digit sensitive to the input for only a short period of time during each cycle and by spacing the intervals during which the channels are capable of responding in time from one another, no overlap in operation is possible so that errors are reduced to a minimum.

It will be understood that the specific embodiment described above and shown in the drawings is susceptible of numerous modifications in form and detail within the spirit of the invention. Therefore, the invention is not to be thought of as restricted to the embodiments shown but rather as broad as the scope of the following claims will permit.

I claim:

1. Apparatus operable to read an analog signal in binary terms comprising; a plurality of selectively triggerable bistable circuits having respective inputs, and each circuit being selectively assumable of a pre-triggering condition rendering the circuit triggerable by a timing pulse to change directly from a reference state to a state productive for its duration of an output signal, the output signals of said circuits having values which progressively diminish in binary ratio to represent binary digits; junction means connecting said inputs in parallel to provide simultaneous supply from said junction means to said circuits of a combined input signal of which said analog signal is a component; biasing means connected to impart to each circuit a threshold signal level at which said circuit becomes responive to said input signal to develop said pre-triggering condition, the threshold level of each circuit being accordant in value with the output signal thereof; timing pulse generator means connected to apply respective time-separated timing pulses of short duration to one after another of said circuits in the order in which the output signals thereof diminish, said timing pulses triggering each circuit then in a pre-triggering condition; and adder circuit means responsive to said analog signal and to each output signal from a triggered circuit to form said combined input signal by combining said analog signal and the sum of said output signals in opposite polarity, said adder means being connected to said junction means to supply said combined input signal thereto.

2. Apparatus as in claim 1 in which said selectively triggerable bistable circuits are electron tube circuits.

3. Apparatus operable in a reading cycle to read an analog signal in binary terms, comprising; a plurality of selectively triggerable bistable circuits having respective inputs, and each circuit being selectively assumable of a pre-triggering condition rendering the circuit triggerable by a timing pulse to change directly from a reference state to a state productive for its duration of an output signal, the output signals of said circuits having values which progressively diminish in binary ratio to represent binary digits; junction means connecting said inputs in parallel to provide simultaneous supply from said junction means to said circuits of a combined input signal of which said analog signal is a component; biasing means connected to impart to each circuit a threshold signal level at which said circuit becomes responsive to said input signal to develop said pre-triggering condition, the threshold level of each circuit being accordant in value with the output signal thereof; timing pulse generator means connected to apply respective time-separated timing pulses of short duration to one after another of said circuits in the order in which the output signals thereof diminish, said timing pulses triggering each circuit then in a pre-triggering condition; adder circuit means responsive to said analog signal and to each output signal from a triggered circuit to form said combined input signal by combining said analog signal and the sum of said output signals in opposite polarity, said adder means being connected to said junction means to supply said combined input signal thereto; and control pulse generator means connected to supply an actuating control pulse to said timing pulse generator means to start said cycle, and connected to supply a later control pulse to each of said circuits to reset the same to said reference state at the end of said cycle.

4. Apparatus operable to read an analog signal in binary terms comprising; a plurality of coincidence circuits having respective inputs, and each circuit being selectively assumable of a partial coincidence condition rendering the circuit responsive to a timing pulse to produce a trigger pulse; junction means connecting said inputs in parallel to provide simultaneous supply from said junction means to said circuits of a combined input signal of which said analog signal is a component; biasing means connected to impart to each circuit a threshold signal level at which said circuit becomes responsive to said input signal to develop said partial coincidence condition, the threshold levels of said circuits having values which progressively diminish in binary ratio, a plurality of bistable circuits of which each is connected to a corresponding coincidence circuit, and of which each is responsive to any produced trigger pulse from the corresponding coincidence circuit to change directly from a reference state to a state productive for its duration of an output signal, the output signal of each bistable circuit being accordant in value with the threshold level of the corresponding coincidence circuit to thereby represent a binary digit; timing pulse generator means connected to apply respective time-separated timing pulses of short duration to one after another of said coincidence circuits in the order in which the threshold levels thereof diminish, said timing pulses causing production of a trigger pulse from each coincidence circuit then in a partial coincidence condition; and adder circuit means responsive to said analog signal and to each output signal from a triggered bistable circuit to form said combined input signal by combining said analog signal and the sum of said output signals in opposite polarity, said adder means being connected to said junction means to supply said combined input signal thereto.

5. Apparatus operable to read an analog signal in binary terms comprising; a plurality of coincidence circuits having respective inputs, and each circuit being selectively assumable of a partial coincidence condition rendering the circuit responsive to a timing pulse to produce a trigger pulse; junction means connecting said inputs in parallel to provide simultaneous supply from said junction means to said circuits of a combined input signal of which said analog signal is a component; biasing means connected to impart to each unit a threshold signal level at which said circuit becomes responsive to said input signal to develop said partial coincidence condition, the threshold levels of said circuits having values which progressively diminish in binary ratio, a plurality of flip-flop circuits of which each is connected to a corresponding coincidence circuit, and of which each is responsive to any produced trigger pulse from a corresponding coincidence circuit to change directly from a reference state to a state productive for its duration of an output signal; proportioning circuit means connected to each flip-flop circuit to render any output signal produced therefrom substantially equal in value to the threshold level of the corresponding coincidence circuit; timing pulse generator means connected to apply respective time-separated timing pulses of short duration to one after another of said coincidence circuits in the order of which the threshold levels thereof diminish, said timing pulses causing production of a trigger pulse from each coincidence circuit then in a partial coincidence condition; and adder circuit means responsive to said analog signal and to each so-equalized output signal to form said combined input signal by combining said analog signal and the sum of said so-equalized output signals in opposite polarity, said adder means being connected to said junction means to supply said combined input signal thereto.

6. Apparatus as in claim 5 in which said coincidence and flip-flop circuits are electron tube circuits, and in which said biasing means and said proportioning circuit means are each in the form of voltage dividing resistance circuits.

7. Apparatus operable in a reading cycle to read an analog signal in binary terms comprising; a plurality of coincidence circuits having respective inputs, and each circuit being selectively assumable of a partial coincidence condition rendering the circuit responsive to a timing pulse to produce a trigger pulse; junction means connecting said inputs in parallel to provide simultaneous supply from said junction means to said circuits of a combined input signal of which said analog signal is a component; biasing means connected to impart to each circuit a threshold signal level at which said circuit becomes responsive to said input signal to develop said partial coincidence condition, the threshold levels of said circuits having values which progressively diminish in binary ratio, a plurality of flip-flop circuits of which each is connected to a corresponding coincidence circuit, and of which each is responsive to any produced trigger pulse from a corresponding coincidence circuit to change directly from a reference state to a state productive for its duration of an output signal; proportioning circuit means connected to each flip-flop circuit to render any output signal produced therefrom substantially equal in value to the threshold level of the associated coincidence circuit; timing pulse generator means connected to apply respective time-separated timing pulses of short duration to one after another of said coincidence circuits in the order in which the threshold levels thereof diminish, said timing pulses causing production of a trigger pulse from each coincidence circuit then in a partial coincidence condition; adder circuit means responsive to said analog signal and to each so-equalized output signal from a triggered flip-flop circuit to form said combined input signal by combining said analog signal and the sum of said so-equalized output signals in opposite polarity, said adder means being connected to said junction means to supply said combined input signal thereto; and control pulse generator means connected to supply an actuating control pulse to said timing pulse generator means to start said cycle, and connected to supply a later control pulse to each of said flip-flop circuits to reset the same to said reference state at the end of said cycle.

8. In digital reader apparatus, the combination of a plurality of first electron tube circuits corresponding, respectively, to a succession of binary digits, and connected in parallel to simultaneously receive a common input signal which at the start of reading has an initial value of which the reading is made, and which may be characterized by abrupt value changes in the course of reading, means rendering each of said electron tube circuits capable of responding only during coincidence of a timing pulse and a value of said input signal equal to or greater than a reference value representing the magnitude of the corresponding binary digit, means for supplying successive, non-overlapping pulses of short duration to said respective first electron tube circuits, a plurality of second electron tube circuits connected to receive the outputs of said first electron tube circuits, each of said second electron tube circuits having a normal operating condition and being adapted to change its operating condition upon receipt of a signal from the corresponding first electron tube circuit, means jointly responsive to a signal which constitutes the only component of said input signal at the start of reading and which represents a quantity whose value is to be read, and, in an accumulative manner, to the operating conditions of said second electron tube circuits for providing said input signal to said first electron tube circuits, and means interposed between said last-named means and each of said second electron tube circuits, and rendered operative upon occurrence of a change in the operating condition of any given second electron tube circuit for reducing the then existing value of said input signal to said first electron tube circuits by an accumulative decrement whose value is in accordance with the magnitude of the binary digit corresponding to said given second electron tube circuit to thereby reduce the initial value of said input signal by an over-all reduction which at any time in the course of reading is formed of the sum of decrements hitherto produced by said second electron tube circuits.

9. In digital reader apparatus, the combination of a plurality of electron tube gating circuits connected in parallel to simultaneously receive a common input signal which at the start of reading has an initial magnitude of which the reading is made, and which may be characterized by abrupt magnitude changes in the course of reading, means rendering each of said gating circuits capable of responding to said input signal only during coincidence of a timing pulse and a magnitude of said input signal equal to or greater than a setting representing the magnitude of a corresponding binary number, means for supplying successive, non-overlapping timing pulses of short duration to said respective gating circuits, a plurality of flip-flop circuits connected to be triggered by said respective gating circuits, adder circuit means responsive to a signal which constitutes the only component of said input signal at the start of reading, and which represents a variable quantity whose value is to be read, and to a summed accumulation of decrements respectively representing changes in the operating conditions of said respective flip-flop circuits for providing said input signal to said gating circuits, means interposed between each of said flip-flop circuits and said adder circuit means for reducing said input signal to said gating circuits from its initial value by the sum of said decrements, the magnitudes of said decrements being respectively rendered by said interposed means in accordance with the magnitudes of the binary numbers corresponding to the ones of said flip-flop circuits that may be actuated to respectively produce the decrements which form said sum, and pulse generator means for cyclically initiating operation of said pulse supplying means and for resetting said flip-flop circuits upon completion of each cycle of operation.

10. In digital reader apparatus, the combination of a plurality of gating circuits for separately producing output signals together representing in binary form the value of a variable quantity received as an input to the apparatus, each gating circuit having signal input terminals and trigger pulse input terminals, a trigger pulse generator for separately supplying differently timed trigger pulses to each one of said gating circuits, means rendering each of said gating circuits capable of producing output signals only during coincidence of a trigger pulse and an input level of magnitudes other than those differing in a predetermined quantitative sense from a predetermined magnitude representing a characteristic binary value for each circuit, a plurality of voltage divider means having adjustable contacts connected to the signal input terminals of said respective gating circuits, cathode follower means including electron tube means having grid, plate and cathode means, cathode resistor means connected in series with said cathode means, voltage regulator means interposed between said cathode resistor means and said cathode means, electrical means connecting said plurality of voltage divider means for energization by the voltage developed by said voltage regulator means, and means jointly responsive to an input of said variable quantity and to the output signals of each of said gating circuits for supplying to said grid means signals representing the difference between the value of the variable quantity and the binary value characterizing each gating circuit.

11. The combination defined in claim 10 in which the trigger pulse generator comprises plurality of blocking oscillators each adapted when pulsed to supply an output pulse of short duration, pulse generator means for supplying a starting pulse to one of said blocking oscillators to produce an output pulse therefrom, connections between successive blocking oscillators for initiating actuation of each blocking oscillator from the preceding blocking oscillators, and means supplying the output puless from each of said blocking oscillators to a trigger pulse input terminal of a corresponding gating circuit.

12. The combination defined in claim 10 in which the means jointly responsive to an input of said variable quantity and to the output signals of each of said gating circuits comprises a plurality of flip-flop circuits connected to be triggered by said gating circuits respectively, means interposed between each of certain of said flip-flop circuits and the grid means of said electron tube means for producing a voltage change upon triggering of the flip-flop circuit which is representative of the magnitude of the binary value characteristic of the gating circuit connected to the corresponding flip-flop, and means responsive to said variable quantity for supplying another input to said grid means in opposition to the voltage changes supplied thereto by triggered flip-flop circuits.

13. In digital reader apparatus, the combination of a plurality of gating circuits corresponding to a succession of binary digits and each having signal input and pulse input terminals, means rendering each of said gating circuits capable of responding to input signals only during coincidence of a timing pulse and a signal input equal to or greater than a setting representing the magnitude of the corresponding binary digit, a plurality of blocking oscillators connected to supply a succession of non-overlapping pulses of short duration to the pulse input terminals of said respective gating circuits, pulse generator means connected to supply a starting pulse cyclically to one of said blocking oscillators, means connecting said blocking oscillators so that the actuation of each one is initiated by actuation of the preceding one, a plurality of voltage divider means having adjustable contacts connected to the signal input terminals of said respective gating circuits, cathode follower means including electron tube means having grid means, plate means and cathode means and resistor means connected in series with said cathode means, a constant potential drop gas discharge device interposed between said cathode means and said resistor means, means connecting said voltage divider means for energization by the voltage drop across said gas discharge device, amplifier means responsive to a variable quantity whose value is to be determined for providing a signal input to said grid means, a plurality of flip-flop circuits connected to be triggered by said gating circuits, respectively, means interposed between each of certain of said flip-flop circuits and said grid means for supplying to said grid means upon actuation of the corresponding flip-flop circuit a signal which opposes the signal supplied by said amplifier means and which is representative of the magnitude of the corresponding binary digit, output means adapted to be actuated by said flip-flop circuits, and reset circuit means responsive to a pulse supplied by said pulse generator means for supplying a resetting pulse to said flip-flop circuits.

References Cited in the file of this patent

UNITED STATES PATENTS 2,444,042 Hartley, et al. ---------- June 29, 1948

14

2,451,044 Pierce ---------- Oct. 12, 1948
2,453,454 Norwine ---------- Nov. 9, 1948
2,499,234 Tourshou ---------- Feb. 28, 1950
2,518,022 Keister ---------- Aug. 8, 1950
2,570,221 Earp et al. ---------- Oct. 9, 1951
2,576,099 Bray et al. ---------- Nov. 27, 1951
2,578,273 Wachtell ---------- Dec. 11, 1951
2,583,711 Scowen ---------- Jan. 29, 1952
2,596,142 Gerwin ---------- May 13, 1952
2,600,744 Eckert, Jr. et al. ---------- June 17, 1952
2,623,115 Woods-Hill et al. ---------- Dec. 23, 1952
2,630,481 Johnson ---------- Mar. 3, 1953

FOREIGN PATENTS 647,811 Great Britain ---------- Dec. 20, 1950